Apr. 10, 1923.

L. A. OSGOOD

COUNTING DEVICE FOR SCALES

Filed Jan. 16, 1920

Inventor
Louis A. Osgood by his Attorneys
Kerr Page Cooper & Hayward

Apr. 10, 1923.
L. A. OSGOOD
COUNTING DEVICE FOR SCALES
Filed Jan. 16, 1920
1,451,403
4 sheets-sheet 2
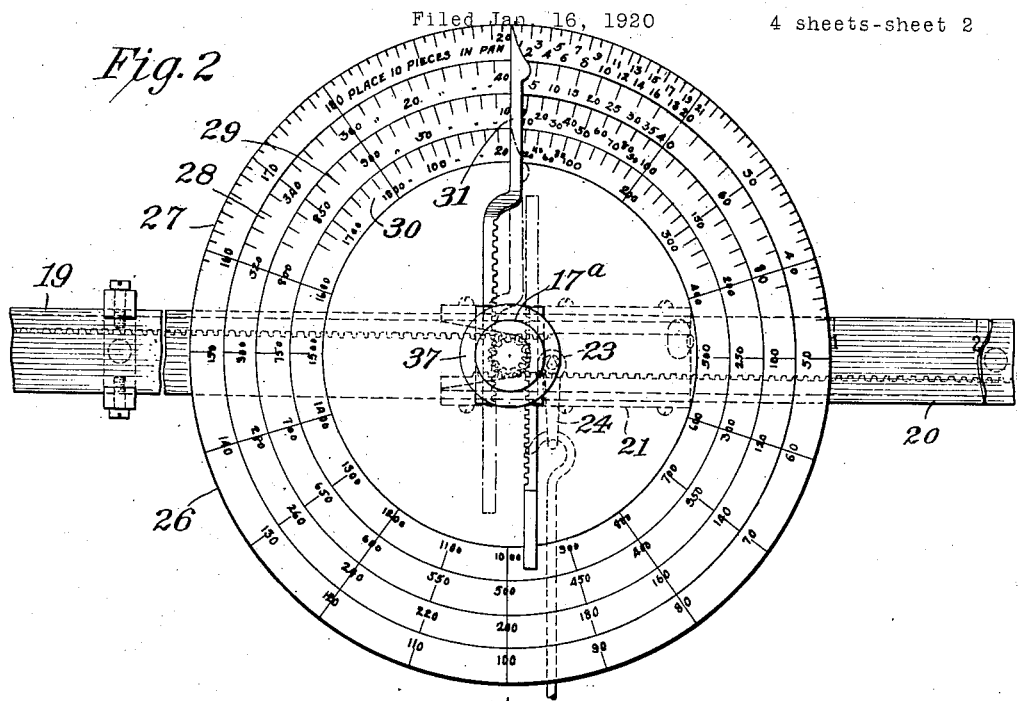
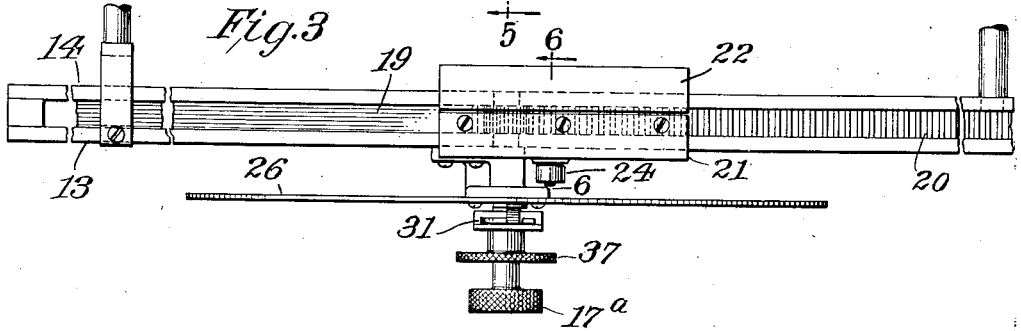
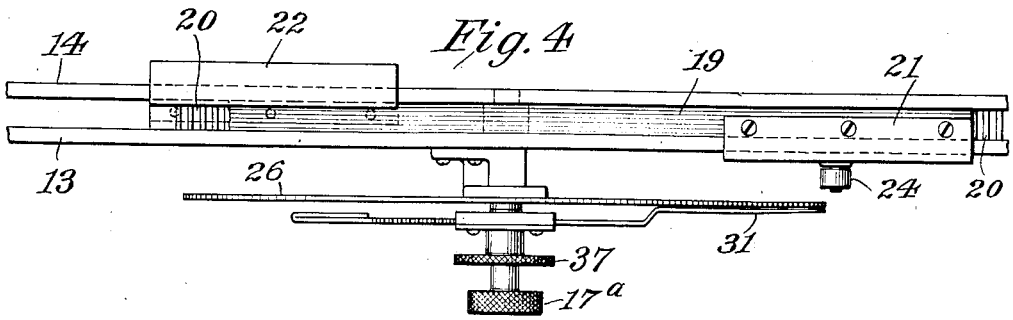
Inventor
Louis A. Osgood
by his Attorneys
Kerr Page Cooper + Hayward Apr. 10, 1923.
L. A. OSGOOD
1,451,403
COUNTING DEVICE FOR SCALES
Filed Jan. 16, 1920
4 sheets-sheet 3
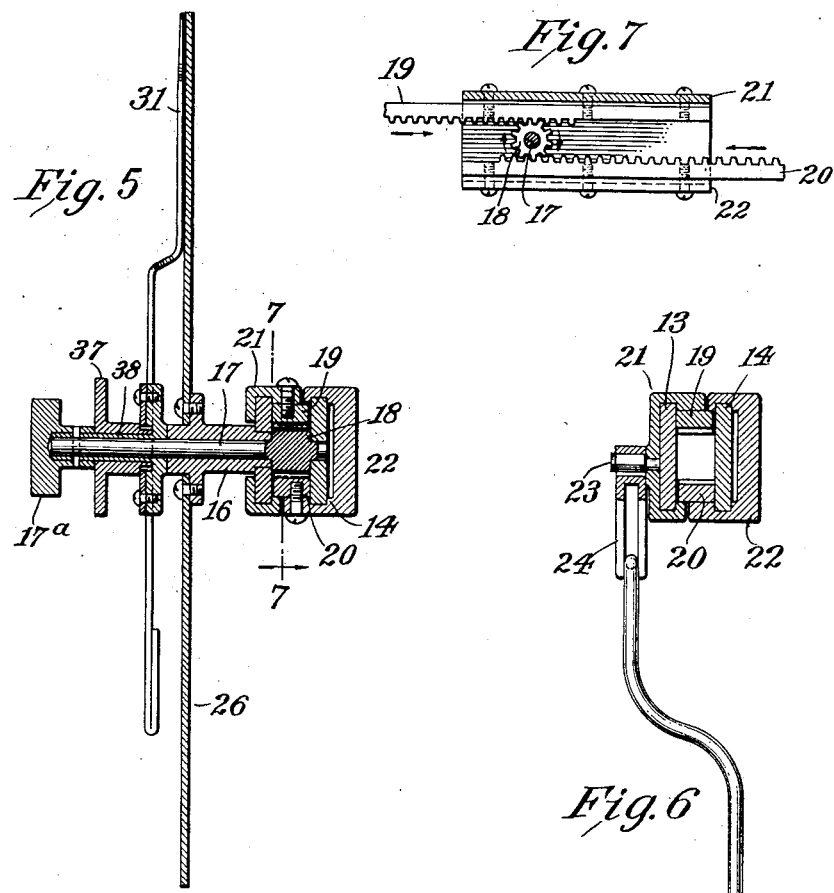
Inventor
Louis A. Osgood
by his Attorneys
Kerr Page Cooper + Hayward Apr. 10, 1923.
L. A. OSGOOD
COUNTING DEVICE FOR SCALES
Filed Jan. 16, 1920 4 sheets-sheet 4
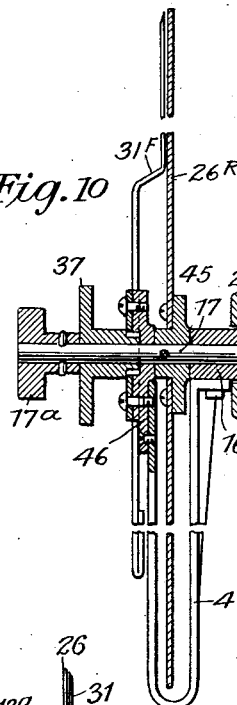
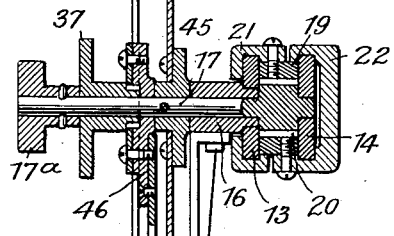
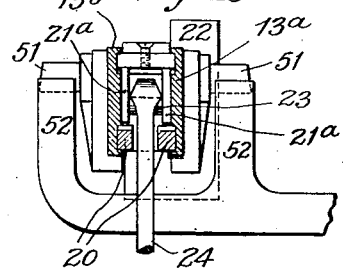
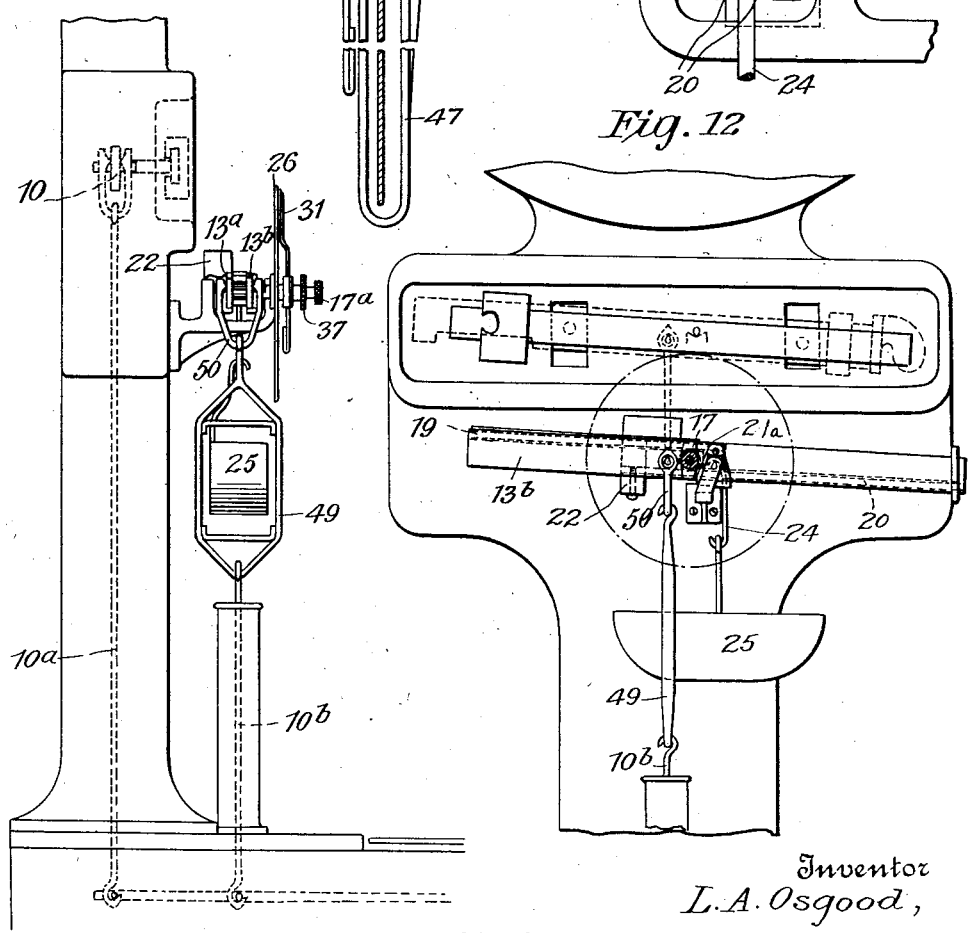
Inventor
L. A. Osgood,
By his Attorneys
Kerr Page Cooper & Hayward Patented Apr. 10, 1923.

1,451,403

UNITED STATES PATENT OFFICE.

LOUIS A. OSGOOD, OF DAYTON, OHIO, ASSIGNOR TO INTERNATIONAL SCALE COMPANY, OF DAYTON, OHIO, A CORPORATION OF ILLINOIS.

COUNTING DEVICE FOR SCALES.

Application filed January 16, 1920. Serial No. 351,975.

*To all whom it may concern:*

Be it known that I, LOUIS A. OSGOOD, a citizen of the United States, residing at Dayton, in the county of Montgomery and State of Ohio, have invented certain new and useful Improvements in Counting Devices for Scales, of which the following is a full, clear, and exact description.

The object of the present invention is to provide an apparatus for the attachment to a scale to provide means for counting the number of articles upon the scale platform or for determining accurately when a desired number of articles of substantially uniform weight have been placed upon the platform.

Like other counting scales the device embodies a receiver in which a definite number of articles may be placed to form a counterbalance weight. Means are provided for adjusting the position of the receiver upon the beam to any desired position and for simultaneously moving a poise upon the beam to counterbalance the weight of the receiver, whereby the weight of the articles in the receiver alone reacts against the beam.

It has formerly been the practise to move the receiver and the counterbalancing poise upon the beam by means of cords and pulleys or by right and left hand screws. In the present embodiment I provide a novel receiver setting means which obviates the use of the cords or screws.

Another object of the invention resides in the provision of a count indicating device in the form of dials and co-operating pointers, one of which is movable relatively to the other, to determine the count, in place of reading the graduations upon the multiple graduated beam formerly employed. The dial construction is advantageous in that a greater length of graduated scale may be employed, with the attendant advantage of a more accurate reading and greater capacity.

Other objects reside in the provision of multiple scales on the dial and an adjustable pointer that may be set to sweep over the particular scale employed. The different scales correspond with the number of articles placed in the receiver and are plainly marked to show the number of articles to be employed thereby minimizing the possibility of errors in reading the count.

Other objects reside in certain details of construction which will hereafter be set forth in further detail.

In the drawings:

Fig. 2 shows an enlarged front view of the dials and supporting beam.

Fig. 3 is a top plan view of the parts shown in Fig. 2.

Fig. 4 is a view similar to Fig. 3 but with the parts in displaced position.

Fig. 5 is a vertical sectional view taken on line 5 of Fig. 2.

Fig. 6 is a similar section taken on line 6 of Fig. 3.

Fig. 7 is a sectional view taken on line 7—7 of Fig. 5.

Fig. 8 is an enlarged detail view of certain of the parts shown in Fig. 5.

Fig. 9 is a detail section view taken on line 9—9 of Fig. 8.

Fig. 10 is a view similar to Fig. 5 of a modification in which the pointer is stationary and the dial movable.

Fig. 11 is a side view of a modified construction in which the counting device is mounted upon a separate beam.

Fig. 12 is a front view of the scale shown in Fig. 11.

Fig. 13 is a detail sectional view of the counting beams and the method of mounting the same at their fulcrum.

Figure 1:
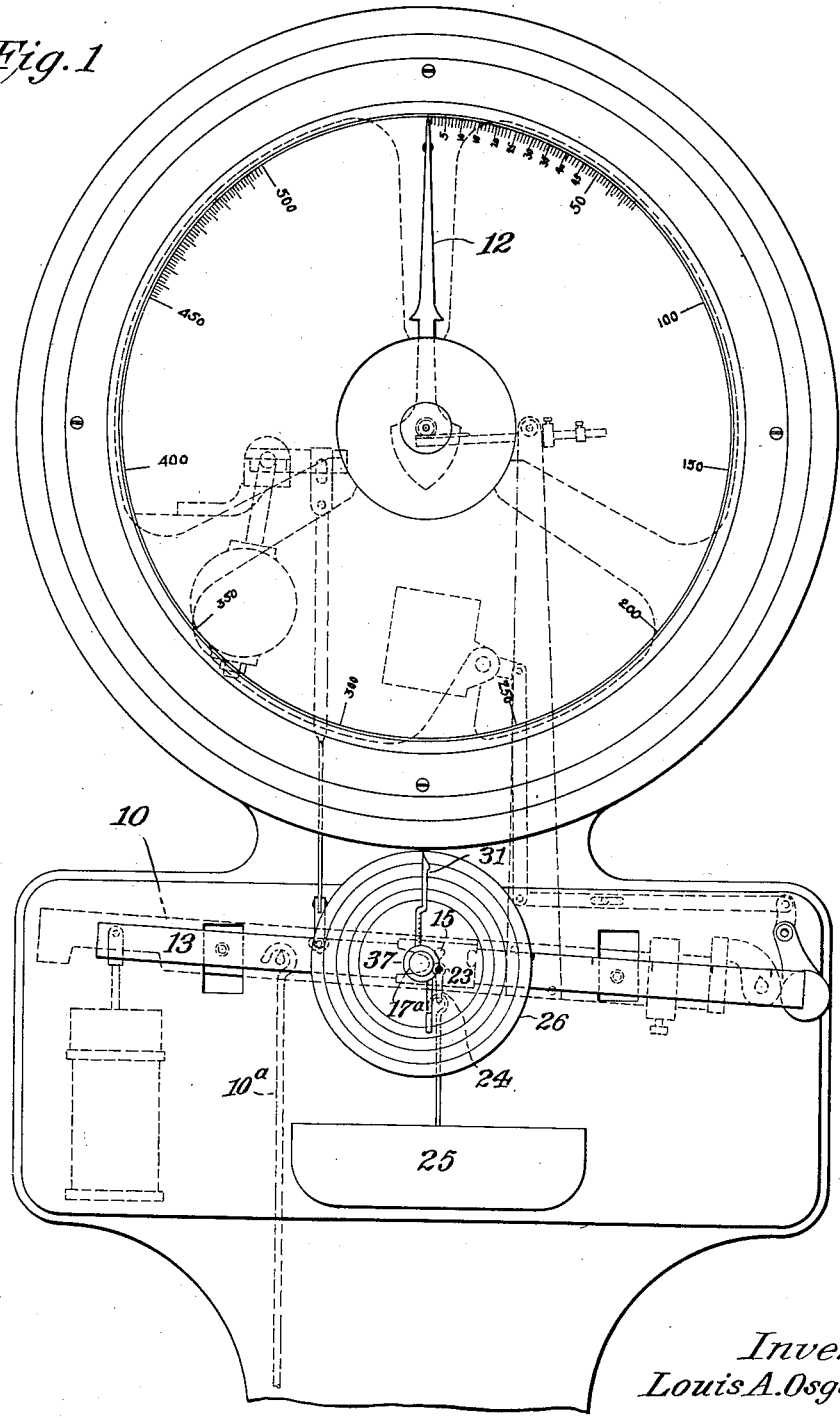
Fig. 1 shows a front elevation of a scale having the counting device associated with its main beam structure.

The scale to which my invention is applied is of the type shown and described in my copending application Serial No. 105,903, filed June 26, 1916. It comprised a counterbalanced main scale beam 10 fulcrumed at 15 and having the usual draft rod 10$^a$ suspended therefrom which connects with the base lever system. The draft rod transmits a force in proportion to the weight of articles weighed to the beam 10. To indicate the weight there is the usual weight indicator or pointer 12 which pointer is suitably connected with beam 10.

Outside of the case at the front is a structure which is connected to move in unison with the main scale beam 10. This structure consists of two longitudinally disposed parallel counting beams 13 and 14. The counting beams are connected together and to the main scale beam by suitable brackets. It will be understood that this structure together with the main scale beam 13 is pivotally supported upon pivots 15.

Fixed to beam 13 is a stud 16 (see Fig. 4) which forms a sleeve support for a shaft 17. This shaft at one end carries a knurled knob 17$^a$ and at the other has secured thereto a pinion 18 which is adapted to mesh with an upper downwardly facing rack 19 and a lower upwardly facing rack 20. Rack 19 is fastened to a receiver poise 21 (see Figs. 4 and 5) which is slidably shiftable on beam 13, and rack 20 connects with a counterbalancing poise 22 which is slidably shiftable on beam 14. Poise 21 carries a knife edge 23 which supports, through a trig loop 24, a receiver 25 (see Fig. 5). From Fig. 1 it will be apparent that with the parts in normal position the weight of the receiver will not exert any force on the main scale beam, inasmuch as knife edge 23 is directly under knife edge 15, the main fulcrum point of the beam. Since the receiver hangs on the line of the main fulcrum point of the beam, the weight of the articles therein will also not affect the balance of the scale when the parts are in normal position.

In the counting operation a number of articles are first placed on the platform. If a container is used for these articles the weight of the container is tared off in the usual manner by tare beams and poises not shown. A certain number 10, 20, 50, or 100 of the articles is then placed in the receiver 25. The knurled knob 17$^a$ is then turned clockwise, advancing rack 19, container poise 21 and receiver 25 to the right, and rack 20 and counterbalancing poise 22 to the left. The weight of poise 22 is such that it is adapted to just counterbalance the weight of receiver 25, and receiver poise 21. The receiver and receiver poise 21 therefore exert no unbalanced force on the main scale beam irrespective of their position thereon.

The weight of the articles in the receiver, however, does exert a force upon the beam, the amount of the force depending upon the number of articles in the receiver, their weight and the position of the receiver on the beam.

Knob 17$^a$ is manually turned clockwise until the receiver is shifted to such a point as to cause the weight of the articles therein to exert just sufficient force on the main scale beam to overcome the pull due to the weight of the articles on the scale platform. This restores the main lever and the weight indicating devices to normal zero position.

From the foregoing it will be apparent that the distance the container 25 has moved to the right from normal position will be a measure of the count of the articles on the platform. In order to read this count I provide a count indicating mechanism which will now be described.

Fixed to stud 16 is a circular dial 26, having four rows of graduations or scales 27, 28, 29 and 30. A pointer 31 is mounted so as to rotate in unison with the rotation of knob 17$^a$. Scale 28 has 400 graduations, 29 has 1000 and 30 has 2000 graduations, and each scale has plainly marked thereon the number of articles to be placed in the receiver when that particular scale is to be used. For example if 10 articles are placed in the receiver and knob 17$^a$ and pointer 31 are turned 360° to bring the main scale weight indicator to zero, the pointer 31 will stand opposite the 200 mark on scale 27, thereby indicating that there are 200 articles on the platform.

In order to set the pointer 31 so that its tip extends to the particular scale utilized I provide means for advancing or retracting the pointer and for concurrently counterbalancing the pointer. This means comprises a knob 37 which is rotatable about sleeve 38 and provided with gear teeth 40 meshing with rack teeth on pointer 31 and similar rack teeth on a counterbalancing member 39.

These parts provide for the advancing of the pointer to the particular scale and for providing a variable counterbalance so that the balance of the whole will not be affected when the pointer is moved. It will be understood from Fig. 7 that the pointer 31 and counterbalancing member 39 rotate in unison with sleeve 38, which rotates with shaft 17.

While I have shown the dial stationary and the pointer movable, it is obvious that the movement of the indicating elements may be reversed and that the pointer may be fixed and the dial movable. The preferred construction is the fixed dial, since with a counting scale the operation is frequently required to fill a requisition for a fixed number of pieces. The motion of the dial makes it difficult to follow the moving figures with the edge, and arrest the movement when a particular number is in line with the pointer. This difficulty disappears when the dial is fixed and the pointer is movable, and I accordingly prefer the fixed dial construction.

While this is the preferred form, I do not desire to be limited to that construction, since in the broad aspect the invention contemplates a count indicating device including a dial element and a pointer element one of which is movable relatively to the other.

In Fig. 10 the movable dial and fixed pointer arrangement is shown. Here the rotatable dial 26$^R$ is fixed to an annular member 45 which in turn is pinned to shaft 17. The relatively fixed or non-rotatable pointer 31$^F$ is carried by an annular member 46 in which shaft 17 is rotatable. Part 46 is also attached by a suitable bracket 47 to the part 16 which is carried by the beam structure. In other respects the device is like the previously described construction and similar reference characters will apply.

While I have herein shown a structure for supporting the receiver and counterbalance as attached to the main scale beam, in certain cases it may be desirable to detach the structure from the main beam and to provide a supplementary beam for supporting it. In such cases a double draft rod would be employed and the main and supplementary beams would move in unison. The supplementary beam structure is advantageous when heavy articles are to be placed in the receiver, which might tend to tip the main scale beam sidewise and interfere with the accuracy of the scale.

Figs. 11 to 13 show the above modified construction. Here two draft rods 10ª and 10ᵇ are employed. The former runs to the main scale beam 10, which is mounted in the usual way and has connected to it the tare beams and the counterbalancing and indicating devices. The other draft rod, 10ᵇ, connects through a framed loop 49 with a loop 50 which is pivotally connected with the counting beams 13ª and 13ᵇ. These beams carry outwardly extending fulcrum pivots 51 which rest in bracket bearings 52 extending from the frame of the machine. Instead of carrying the knife edge 23 on a poise I support this knife edge between the two beams 13ª and 13ᵇ by means of depending bosses from the rack 19. These bosses correspond with the poise 21 and are marked 21ª in Fig. 13. Inasmuch as the loop 24 must pass through rack 20, I slot this rack as shown in Fig. 13. In all other respects this construction is similar to the construction hereinbefore described.

I claim:

1. In a counting scale, the combination of a main scale beam, an automatic counterbalance therefor, an indicator displaceable from zero in accordance with the displacement of the beam, a pair of counting beams movable in unison with the main beam, a receiver carried by one of said beams and shiftable relatively to the fulcrum of the main beam, a counterbalancing poise carried by the other beam and also shiftable relatively to the fulcrum of the main beam, and means for moving the counterbalancing poise and receiver in unison and thereby causing the weight of the articles in the receiver to react upon the main scale beam and its automatic counterbalance, and thereby displace the indicator to zero and show that the applied load is balanced by the articles in the receiver.

2. In a counting scale, a main scale beam, auxiliary counting beams movable in unison therewith, a receiver carried thereby and shiftable relatively to the fulcrum of the main beam, a counterbalancing means carried thereby adapted to counterbalance the weight of the receiver, said means being also shiftable relatively to the fulcrum of the main beam, and means for shifting said receiver and counterbalancing means concurrently, said means comprising a pair of racks and a common pinion coacting with each of the said racks.

3. In a counting scale, in combination, a receiver, a counterbalancing means therefor, a supporting means for the receiver and the counterbalancing means, a pair of racks, one rack being attached to the receiver and the other rack being attached to the counterbalancing means, a pinion meshing with both of said racks for advancing or retracting the same concurrently and manually operated means for rotating the pinion.

4. In a counting scale, in combination, a main scale beam, a plurality of counting beams movable in unison therewith, a receiver poise carried by one of said beams, a counterbalancing poise carried by the other of said beams, said poises being slidably shiftable on said beams, a pair of racks extending longitudinally between the beams, one rack being fastened to one poise and the other rack being fastened to the other poise, and a pinion rotatably carried by one of the beams and coacting with the said racks, and manually operated means for rotating the pinion.

5. In a counting scale, a main scale beam, a weight indicator and a weight dial, a structure movable in unison with the main scale beam, a counterbalanced receiver shiftably mounted on said structure and of itself irrespective of its position exerting no opposing force to the movement of the beam, manually operated means for shifting the counterbalanced receiver relatively to the fulcrum of the main beam to cause the weight of the articles therein to exert an opposing force on the beam and bring the weight indicator back to zero position, and rotary indicating devices positioned variably by the manually operated means for displaying the count of the articles on the scale as counterbalanced by the weight of the articles in the receiver.

6. In a counting scale, a main scale beam and a structure movable in unison therewith, a receiver and a counterbalance therefor carried by and shiftable on said structure relatively to the fulcrum of the main scale beam, manually operated means for shifting the said receiver and counterbalancing means, and a count indicating device including a graduated dial element and a pointer element one of said elements being movable relatively to the other element by the aforesaid manually actuated means in accordance with the extent of movement of the receiver and to thereby indicate the count of the articles upon the scale.

7. The invention set forth in claim 6 in which the dial is provided with a plurality of graduated scales, the graduations of said different scales corresponding with the count of the articles on the scale as counterbalanced by a varied but predetermined number of articles in the receiver.

8. The invention as set forth in claim 6 in which the dial is provided with a plurality of graduated scales, the graduations of the different scales corresponding with the count of the articles on the scale as counterbalanced by a varied but predetermined number of articles in the receiver, the pointer being adapted to be adjusted into alignment with any desired graduated scale.

9. In a counting scale, a scale beam and a structure movable in unison therewith, a receiver and a counterbalance therefor carried by and shiftable with respect to said structure and relatively to a fulcrum point of the aforesaid scale beam, manually operated means for shifting said receiver and counterbalancing means, a fixed graduated dial and a pointer relatively movable thereto, said pointer being movable by the manually actuated means in unison with the movement of the receiver to thereby indicate upon the fixed graduated dial the extent of movement of the receiver and the count of the articles upon the scale as counterbalanced by the articles in the receiver.

10. The invention as set forth in claim 9, in which the dial is provided with a plurality of graduated scales the graduations of the different scales corresponding with the count of the articles on the scale as counterbalanced by a varied but predetermined number of articles in the receiver, the pointer being adapted to be adjusted so as to cause the same to sweep over any desired graduated scale.

11. In a device of the class described, a counting dial having a plurality of scales thereon, a pointer adapted to sweep over said dial, means for adjusting the pointer to bring the same into cooperation with a desired scale on the dial and means for counterbalancing the said pointer in all of its various adjusted positions to prevent its exerting a variable force upon the parts to which it is attached when the said pointer is set to sweep over different scales.

12. In a weighing scale, in combination with an automatically counterbalanced main scale beam, an indicator therefor, of a counting attachment comprising a counting beam structure movable in unison with the main scale beam, an article receiver carried thereby, means for displacing the receiver relative to its support, to thereby cause the weight of the articles therein to impart varying offsetting forces to the scale beam, means for counterbalancing the weight of the receiver itself in its various positions, and means including a relatively movable pointer and dial for indicating the displacement of said article receiver and directly displaying the count of the articles on the scale offset by the articles therein.

13. A weighing scale adapted for both weighing and counting operations, comprising a main scale beam, an automatic counterbalance therefor and a weight indicator to show the automatically counterbalanced load, a counting attachment movable in unison with the main scale beam and comprising a shiftable receiver which of itself, irrespective of its position, exerts no opposing force to the movement of the beam, means for shifting the receiver to thereby cause the weight of the articles therein to exert a force upon the beam sufficient to bring the weight indicator back to zero, and rotary count indicating devices positioned by the aforesaid shifting means for displaying the count of the articles on the scale as counterbalanced by the weight of the articles in the receiver.

14. The invention as set forth in claim 12 in which the dial is provided with a plurality of graduated scales, the graduations of said different scales corresponding with the count of the articles on the scale as counterbalanced by a varied but predetermined number of articles in the receiver.

In testimony whereof I hereunto affix my signature.

LOUIS A. OSGOOD.